March 6, 1928. Re. 16,895

W. D. LA MONT

STEAM GENERATOR

Original Filed Dec. 22, 1918 3 Sheets-Sheet 1

INVENTOR
W. D. LAMONT
BY
Newell and Spencer
ATTORNEYS

March 6, 1928. Re. 16,895
W. D. LA MONT
STEAM GENERATOR
Original Filed Dec. 22, 1918 3 Sheets-Sheet 2
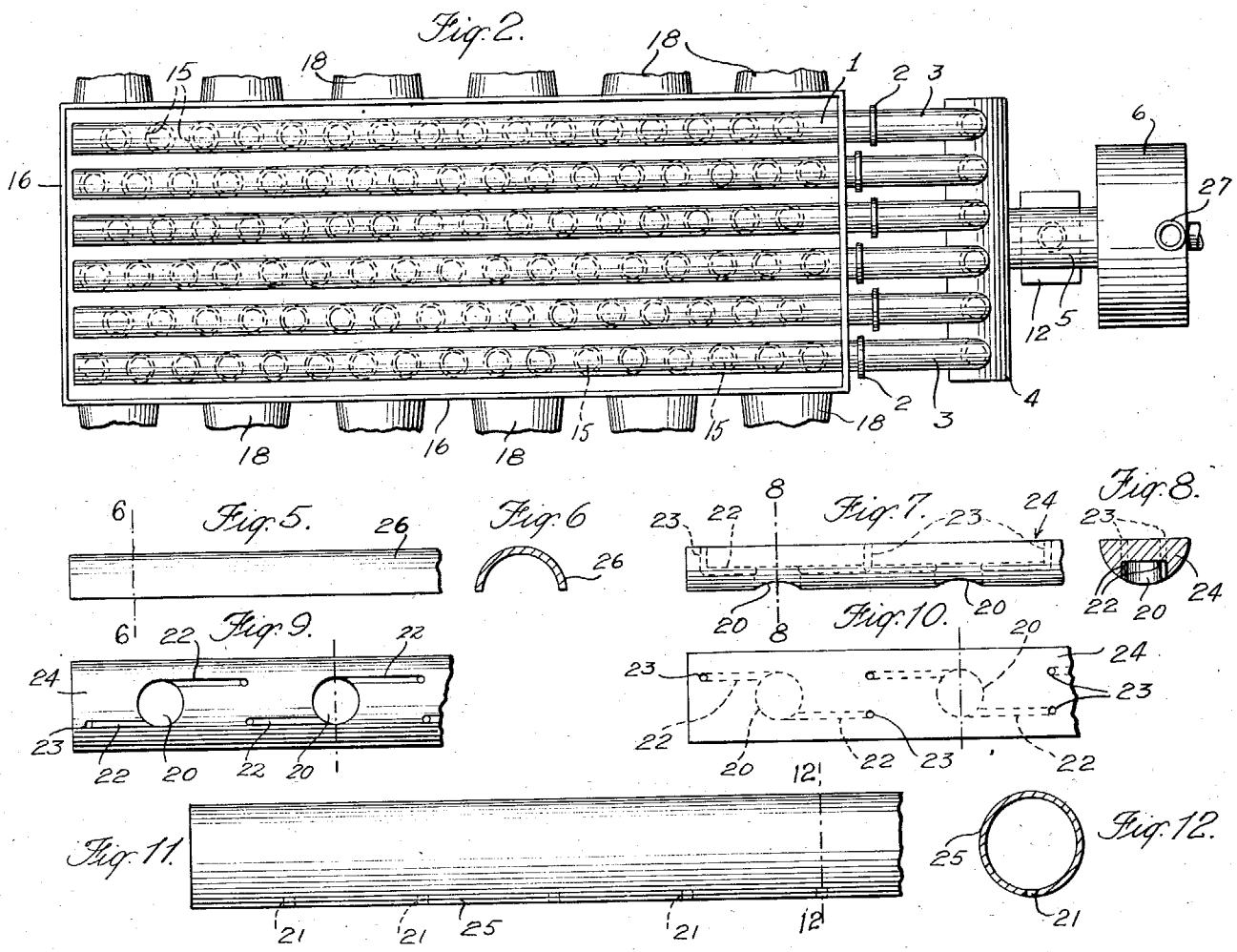
INVENTOR
W. D. LAMONT
BY
Prewell and Spencer
ATTORNEYS March 6, 1928. Re. 16,895
W. D. LA MONT
STEAM GENERATOR
Original Filed Dec. 22, 1918 3 Sheets-Sheet 3
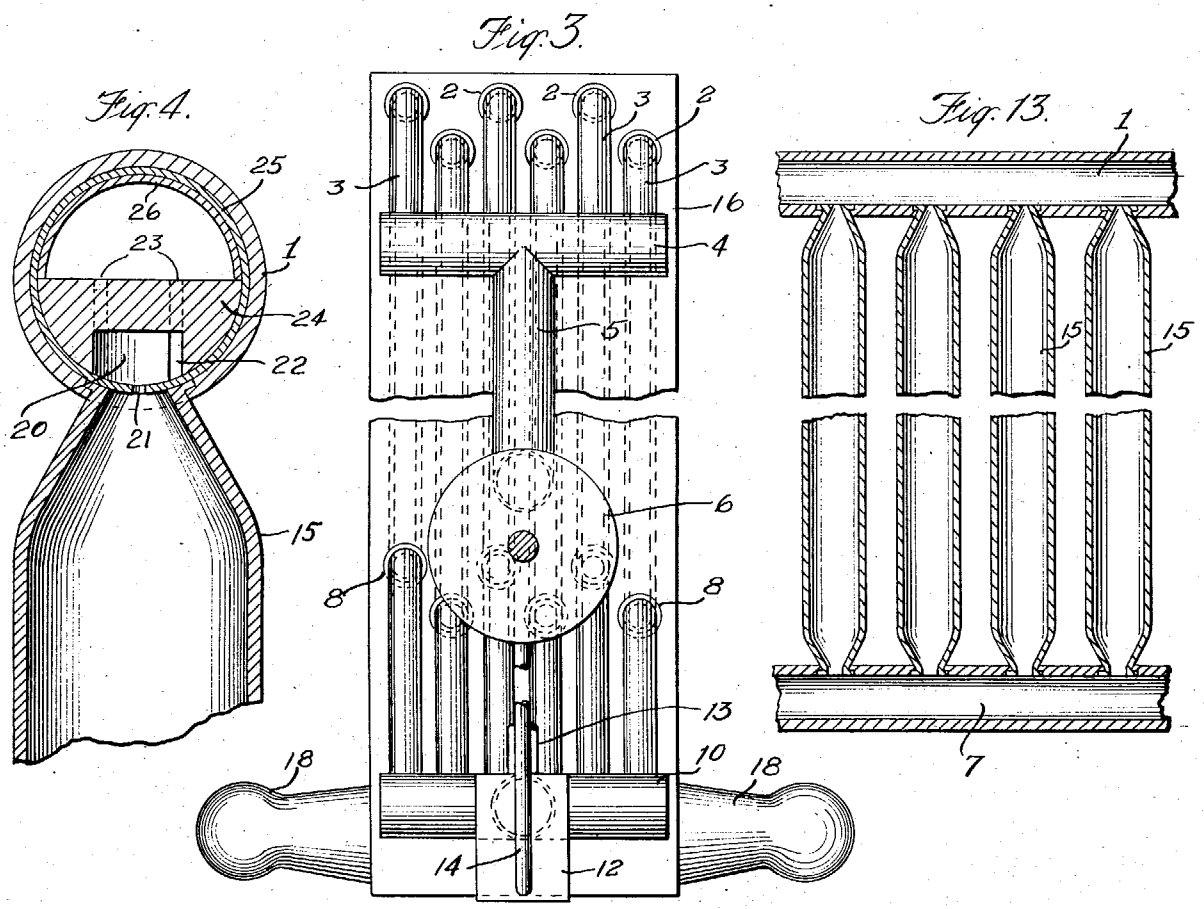
INVENTOR
W. D. LA MONT
BY
Newell and Spencer
ATTORNEYS Reissued Mar. 6, 1928.

Re. 16,895

UNITED STATES PATENT OFFICE.

WALTER DOUGLAS LA MONT, OF LARCHMONT, NEW YORK, ASSIGNOR, BY MESNE ASSIGNMENTS, TO LA MONT CORPORATION, OF NEW YORK, N. Y., A CORPORATION OF NEW YORK.

STEAM GENERATOR.

Original No. 1,545,668, dated July 14, 1925, Serial No. 268,651, filed December 28, 1918. Application for reissue filed July 9, 1927. Serial No. 204,634.

My invention relates to methods of and means for generating steam and has for its object a method of generating steam by which steam at high pressure adapted for use in steam engines may be generated quickly from a small amount of water constantly supplied so that the weight of water carried in the generator during the process of generating the steam will be the least possible and will add as little as possible to the weight of the generator itself. The invention also has for its object to provide a steam generator adapted to carry out the method described which will be simple in construction, compact and of relatively light weight and will be adapted to effectively and safely generate steam rapidly and at high pressure from a relatively small amount of water.

My invention is particularly intended for generating steam for a steam engine for use in driving the propeller of an aeroplane. The advantages of a steam engine for this purpose over the explosion engine, particularly as regards possibility of continuous operation for many hours, long life of the engine as a whole, freedom from vibration and the fatigue of the metal of the engine shaft and other parts affected by vibration, as well as other advantages, have long been recognized but it has not heretofore been found possible to produce an engine and generator, which, when in operation, that is with water in the generator, would be sufficiently light in weight to be used. The difficulty so far as the engine itself is concerned has been overcome, it being possible to construct engines of the turbine type which are sufficiently light in weight per horse power furnished for use in an aeroplane; and the condenser also presents no difficulty as it is possible to design a condenser of the honeycomb type sufficiently light for the purpose. The serious difficulty has been in the generator. Generators which have been constructed of relatively light weight in themselves have been found when in use, that is, when supplied with the water necessary for effective operation, of a weight much too great to permit of their being used in an aeroplane.

By the use of my invention it is possible to generate steam in sufficient quantity and at sufficient pressure to effectively operate the engine of an aeroplane without exceeding a weight, for generator and the water contained in it during the process of generating steam, which is well within the limit permissible for use in aeroplanes and it is also possible to superheat the steam generated so as to deliver it to the engine at any temperature and pressure desired.

With the above described objects and others hereinafter set forth in view, my invention consists in the method of and means for generating steam hereinafter described and particularly pointed ont in the claims.

Referring to the drawings—

Figure 2 is a top plan view of the generator shown in Figure 1.

Figure 3 is an end view of the same.

Figure 4 is a central vertical cross-sectional view of the upper end of one of the generating tubes and the distributing tube showing the spraying nozzle strip in position.

Figure 5 is a side view of a portion of the locking strip for holding the spraying nozzle strip in position, and Figure 6 is a cross-section of the same on line 6—6 of Figure 5.

Figure 7 is side elevation of a portion of the spraying nozzle strip and Figure 8 is a cross-sectional view of the same in line 8—8 of Figure 7.

Figure 9 is a bottom plan view of a portion of the spraying nozzle strip shown in Figures 7 and 8.

Figure 10 is a top plan view of a portion of the spraying nozzle strip.

Figure 11 is a side elevation of a portion of the lining tube for the distributing tube and Figure 12 is a cross-section of the same on line 12—12 of Figure 11.

Figure 13 is a fragmentary sectional view similar to Figure 1, but showing the generator tubes merged in at their upper and lower ends where they are secured to the distributing pipe and the collecting pipe.

Figure 1:
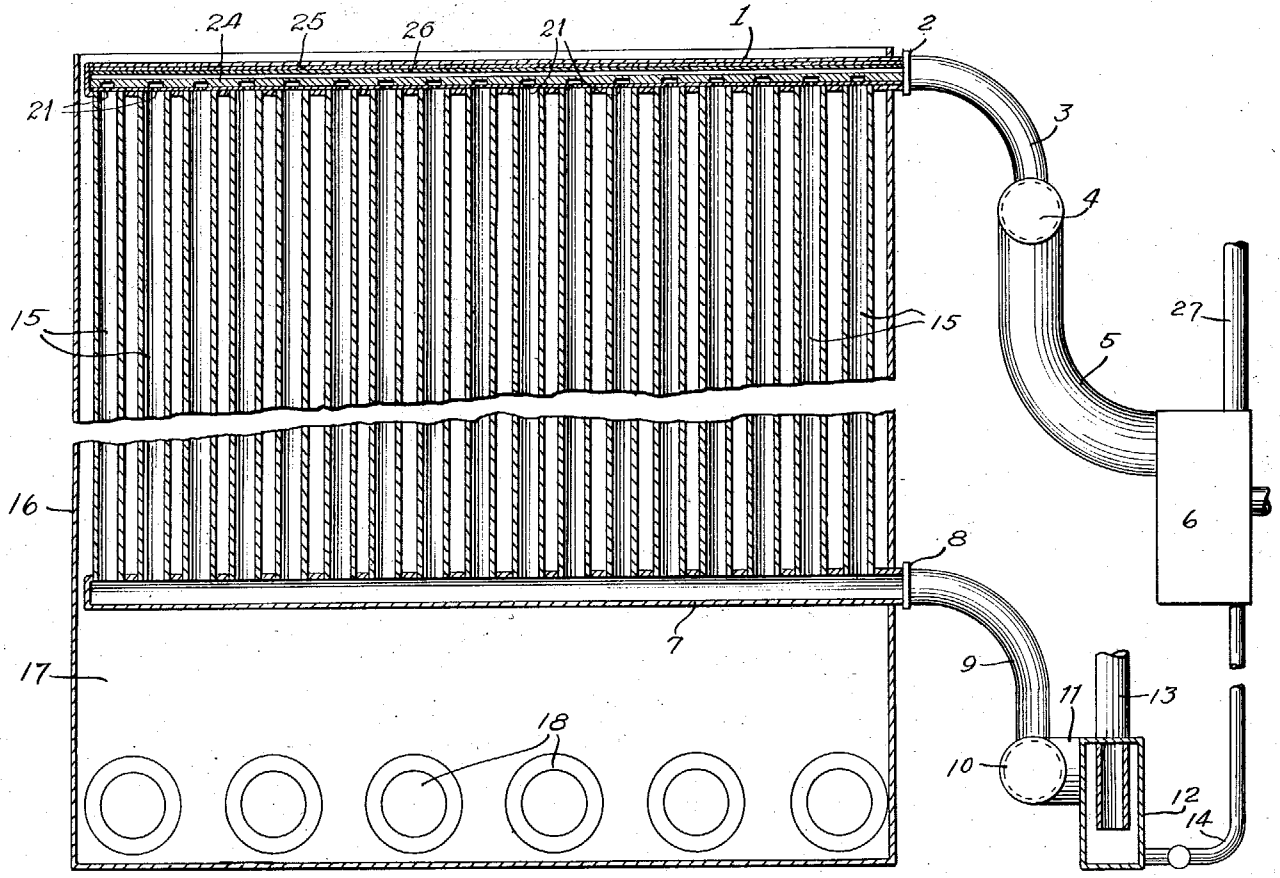
Figure 1 is a longitudinal vertical sectional view of a steam generator adapted to carry out my method and embodying my means for generating steam.

It should be understood that so far as concerns the method the drawings are illustrative merely and are not intended to limit the invention to the use of the apparatus shown or to any particular form or construction of apparatus.

In the drawings, 1 indicates a distributing tube at the upper end of the generator closed at one end and having connected to it at the other end by coupling 2 a pipe 3 leading from a header pipe 4 to which leads a water supply pipe 5 from a feed pump 6, preferably a centrifugal pump. 7 indicates a collecting pipe near the lower end of the generator closed at one end and connected at its other end by coupling 8 to a pipe 9 leading to a header pipe 10 from which a pipe 11 leads to a separator 12 for separating the steam from the water discharged from the collecting pipe 7. From this separator a pipe 13 leads upward to the engine, not shown, but preferably of the turbine type, and from the lower end of the separator a suitably valved pipe 14 leads to the pump 6 to take the water separated from the steam back to the pump to be again supplied to the distributing pipe 1.

From the distributing pipe 1 to the collecting pipe 7 extend a series of generator tubes 15 suitably secured by welding or otherwise at their ends in the pipes 1 and 7. In actual construction, each of these tubes is 15 feet long, is one-half inch in exterior diameter, of seamless drawn steel with walls twenty-eight thousandths of an inch thick but, of course, the length and diameter and other dimensions may be varied as desired. These tubes are arranged at equal distances apart along the tubes 1 and 7, preferably so that their outer surfaces will be separated one from the other approximately one-fourth inch. In the construction shown, there are six of the distributing tubes 1 and collecting tubes 7, each distributing tube being connected with the header pipe 4 and each collecting tube being connected to the header pipe 10. For compactness alternating distributing pipes are elevated above the intermediate ones, the same arrangement being followed with the collecting pipes. The tubes 15 connected with one distributing pipe 1 are arranged opposite the spaces between the tubes 15 connected with the next adjacent distributing pipe.

The tubes 15 with their distributing pipes and collecting pipes are enclosed in a suitable casing 16, preferably open at the top and consisting or kieselguhr composition on a wire netting. This casing extends below the collecting tubes 7 to form a combustion chamber 17 into which a series of oil atomizing burners 18 discharge, the flame playing upward through the spaces between the tubes 15 and heating them to a high temperature.

In order to avoid the filling of the tubes with water, I provide, in accordance with my invention, for so distributing the water in each of the tubes 15 that it will form a thin coating or film on the inner surface of each tube, which will be maintained as a continuous film from the distributing tube 1 to the collecting tube 7, or nearly to the collecting tube if it is desired to superheat the steam as hereinafter explained, so as to leave a central passage open at its lower end into which the steam generated from the film may escape as it is formed and may pass freely to the collecting tube. By reason of the fact that the water is thus in a thin layer or film, steam is generated rapidly and it is found possible to evaporate a much greater amount of water per unit of surface per unit of time than would be possible to evaporate if the tubes were filled with water, and it is also possible to deliver the steam downward without an excessive amount of water.

The steam thus generated is, of course, under pressure which is maintained by the resistance of the turbine or other engine in which the steam is used and as it has its outlet only from the lower end of the tube, it is necessarily maintained in the tube as a column having its upper end towards the upper end of the tube and in the path of the water coming from the nozzle. As steam has, as compared with water, little or no tendency to adhere to a metal surface, this column of steam will locate itself centrally in the tube, the water coming from the nozzle, by reason of its inherent tendency to adhere to a metal surface, clinging to the walls of the tube, filling the annular space between the column of steam and these walls and forming the film as described, this film extending downward towards the lower end of the tube a distance depending on the amount of water supplied and extending to the lower end of the tube if the quantity of water supplied is greater than the amount evaporated as will ordinarily be the case.

From the foregoing description it will be noted that the method of generating steam of the present invention differs essentially from that employed in the so-called "flash" boilers or generators in which the water is sprayed against highly heated surfaces in quantity only sufficient to insure substantially instantaneous complete volatilization, thermostatic means being usually provided to effect an automatic control of this quantity.

Among the advantages of the method of the present invention is that the generation of the steam from a film on the inner wall of the tube in contra-distinction to the explosive action of flash generation is more uniform and continuous and does not require the careful regulation that is necessary with the "flash" boiler. Moreover, the present invention permits the employment of relatively thin tubes, permitting a very rapid heat exchange without danger of the tubes being burned out, the film of water protecting the tubes against this.

When the generator of the present invention is operated in the preferred manner, the film is caused to extend substantially to the lower end of the tube so that water and steam are discharged together at this end, thereby avoiding any necessity for accurate control of the water feed which, as above pointed out, is requisite in "flash" boilers. The generator of the present invention operates with a very high degree of efficiency under varying demands with a minimum control of the water feed.

There are thus combined in this steam generator the advantage of light weight incidental to the use of relatively small quantities of water in the generating tubes in the process of steam generation, the advantage of protection afforded to the tubes by the maintenance of a film of water on the inside thereof during the generation of the steam, and the advantage of doing away with the necessity for careful variation of the water feed to meet varying demands made upon the generator.

For the purpose of causing the water to be introduced into the tubes 15 in such manner as to form a film on the interior surface of the tubes, any convenient form of distributing or spraying device which will cause the water to be sprayed against the walls may be used, but the device which I prefer to use for this purpose consists of a nozzle having a chamber 20 of relatively large diameter directly above the tube 15 having a discharge orifice 21 of relatively small diameter in line with the axis of the tube, in which the water is admitted to the chamber 20 through passages 22 arranged at tangents to the periphery of the chamber so as to cause the water as it enters the chamber to whirl or rotate and to be discharged through the orifice 21 as a rotating stream throwing the water as a centrifugal spray against the walls of the tube. The chamber 20 is preferably formed in a solid piece of metal through which passages 23 lead to the outer ends of the tangential passages 22.

Each of the distributing tubes 1 has connected with it a considerable number of tubes 15. In the construction shown each distributing tube carries seventeen tubes 15. In order to provide a spraying nozzle for each of these tubes, I form the necessary number of chambers 20 at distances apart corresponding to the distance apart of the tubes, in the lower or convex surface of a semicircular strip 24 and form in this lower or convex surface the tangential passages 22 as grooves leading from the passages 23 which extend through the strip to the upper or flat face. This semicircular strip fits within a tube 25 which fits within the distributing tube 1 and has formed in it at such intervals that when in position each one will be in line with the axis of a tube 15, the discharge orifices 21. The semicircular strip 24 is held in position in the tube 25 by a semicylindrical locking strip 26 or by other convenient means. The diameter of the chamber 20 is preferably about one-fourth of an inch in diameter but may be larger. The discharge orifice 21 is preferably about four hundredths of an inch in diameter.

In operation water is forced by the feed pump 6 through the pipes shown into the space above the nozzle strips 24 within the inner tubes 25 in the distributing pipes 1, and through passages 23 and tangential passages 22 into chambers 20 and enters the upper ends of the tubes through discharge orifices 21 in the form of a centrifugal spray thrown outward against the walls of the tubes and forming on these walls a thin layer or film. So long as the pressure on the water exceeds the pressure of steam in the tubes water will be forced into the ends of the tubes and will form a film as described and this film will extend as a continuous film throughout the length of the tube or such part of the length of the tube as may be desired, depending on the excess of the pressure on the water over the pressure of the steam generated. For ordinary purposes the pressure on the water should be such that the film will extend to the lower ends of the generator tubes and water and steam will be discharged together into the collecting tubes. The circulating pump 6, being within the boiler circuit so that it is subjected to boiler pressures on both its intake and discharge sides, must supply only sufficient pressure to elevate the water to the upper ends of the tubes and to overcome the drop in pressure through the spraying nozzles for the respective tubes and the back pressure in the tubes which, of course, will vary somewhat with the diameter and length of the tube and will also vary somewhat with the pressure at which the steam is being generated. As ordinarily operated, the pump will be driven to supply a sufficient excess pressure over the back pressure, etc. so that water in excess of the generating capacity of the tube but less than sufficient to fill the tube will be delivered to the inner wall of each tube whereby both steam and water will be discharged from the lower ends of the tubes. If it is desired to superheat the steam the pressure on the water is reduced so that the film will not extend to the lower ends of the generator tubes so that the steam generated from the film will come in contact with the walls of the generator tubes below the film and in the collected tubes and will be superheated by such contact.

From the collecting tubes the water and steam passes to the separator from which the steam passes by pipe 13 to the engine and condenser from which the water of condensation is returned to the feed pump by pipe 27 by which is also supplied, as may be required, water from the make up feed. The water separated from the steam in the separator 12 passes by pipe 14 to the feed pump which it enters at nearly the temperature at which it came from the generator and is returned to the distributing tubes at substantially this temperature, thus entering the generator tubes highly heated. If the steam is superheated, as above described, there will, of course, be no water to be separated from the steam and the feed pump will be supplied from the condenser.

The high pressure of the steam in the generator tubes stiffens the tube against any tendency of the tube to buckle from any unevenness of heating. The free escape of the steam, as it is generated through the passage at the center of the tube, facilitates the rapid and continuous evaporation of the water and thus permits of and necessitates a very rapid feed in order to maintain the film throughout or substantially throughout the length of the generator tubes. The water is thus required to and does circulate rapidly in contact with the heated surfaces of the tubes, a condition which facilitates effective generation.

The length of the generator tubes corresponds to the vertical distance between the two planes of the biplane on which it is to be used, the open upper end of the casing 16 extending through the upper plane so that the products of combustion will be discharged above this upper plane. The relatively great lengths of the generator tubes permits of utilizing a very high percentage of the heat produced by the burners.

While, as above stated, the invention is particularly adapted and intended for use in connection with aeroplane engines, it is obviously adapted for use in connection with steam generators for other purposes and may readily be adapted to any water tube type of boiler in which the tubes are arranged other than horizontal, that is, are so arranged that one end is substantially higher than the other so that the film formed on the interior of the tubes will be free to move downward and will be aided in its movement by gravity.

Claims to certain separable subject matter common to this application and to my copending application, Serial No. 32,064 filed May 22, 1925, will be made in my said copending application.

Having thus described my invention what I claim is:

1. The method of generating steam in a heated tube having one end closed to the discharge of steam and higher than the other, which consists in forcing water into the upper end of said tube, and directing the water toward the wall of said tube, said water being continuously introduced in such quantity as continuously to maintain a film on said wall throughout a substantial portion of the length of the tube and to leave the center of the tube unobstructed, and discharging from the lower end of the tube the steam and unevaporated water arriving at said end.

2. The method of generating steam in a heated tube having one end closed to the discharge of steam and higher than the other, which consists in continuously forcing water into the upper end of said tube and against the inner wall thereof in such quantity and at such pressure in proportion to the heat of the tube and the back pressure as will continuously maintain a film on said wall substantially throughout the length of the tube, while leaving the center of the tube unobstructed, and discharging the steam generated from said film and the unevaporated water from the lower end of said tube.

3. The method of generating steam in a heated tube having one end closed to the discharge of steam and higher than the other, which consists in forcing water into the upper end of said tube and against the inner wall thereof in such quantity and at such pressure in proportion to the heat of the tube and the back pressure as will maintain a film on said wall substantially throughout the length of the tube, while leaving the center of the tube unobstructed, and discharging the steam generated from said film and the unevaporated water from the lower end of said tube and separating the steam from the water.

4. The method of generating steam in a heated tube having one end closed to the discharge of steam and higher than the other, which consists in forcing water into the upper end of said tube, and against the inner wall thereof in such quantity and at such pressure in proportion to the heat of the tube as will maintain a film on the said wall substantially throughout the length of the tube, while leaving the center of the tube unobstructed, and discharging the steam generated from said film and the unevaporated water from the lower end of said tube, separating the steam, and returning the water to the upper end of the tube.

5. The method of generating steam in a heated tube having one end closed to the discharge of steam and higher than the other, which consists in continuously forcing water into the upper end of said tube in a quantity greater than will be evaporated in the tube but less than sufficient to fill the tube and directing this water against the wall of the tube, thereby leaving the center of the tube unobstructed to receive the steam generated from the film of water thus formed upon the tube wall, and discharging the steam and unevaporated water from the lower end of said tube.

6. The method of generating steam in a tube of relatively great length in proportion to its diameter and having one end closed to the discharge of steam and higher than the other and its lower end open, which consists in heating said tube by heat-exchanging contact with heated gases traveling up the outside of said tube throughout substantially the whole length thereof, continuously forcing water into the upper end of said tube in quantity greater than will be evaporated in said tube but less than sufficient to fill the tube, directing this water against the inner wall thereof to form a film thereon, leaving the center of the tube unobstructed to receive the steam generated from said film, continuously discharging from the lower end of said tube the steam and unevaporated water reaching said end, and separating the steam from the water.

7. The method of generating steam in a tube having one end higher than the other, which consists in heating said tube by heat-exchanging contact with heated gases traveling up the outside of said tube throughout substantially the whole length thereof, continuously forcing water into the upper end of said tube in quantity greater than will be evaporated in said tube but less than sufficient to fill the tube, directing this water against the inner wall thereof to form a film thereon, leaving the center of the tube unobstructed to receive the steam generated from said film, and continuously discharging steam and unevaporated water from the lower end of said tube, separating the steam from the water, and returning said water to the upper end of said tube.

8. In a steam generator a substantially direct generator tube sufficiently inclined to the horizontal to insure rapid gravity flow and having its upper end closed to the discharge of steam and its lower end open, means for heating the tube, means for continuously forcing water into the upper end of said tube and so directing it against the inner wall thereof as to form a film thereon and leave the center of the tube unobstructed, and means for separating the water from the mixture of steam and water discharged from the lower end of said tube.

9. In a steam generator a substantially direct generator tube sufficiently inclined to the horizontal to insure rapid gravity flow and having its upper end closed to the discharge of steam and its lower end open, means for heating the tube, means for continuously forcing water into the upper end of said tube and so directing it against the inner wall thereof as to form a film thereon and leave the center of the tube unobstructed, means for separating the water from the mixture of steam and water discharged from the lower end of said tube, and means for conducting the separated water back to the upper end of said tube.

10. Apparatus for generating steam, comprising a series of substantially direct generator tubes sufficiently inclined to the horizontal to insure rapid gravity flow and a distributing tube connected to the upper ends of said tubes, a collecting tube connected to the lower ends thereof, means for directing heated gases into heat-exchanging contact with said generator tubes throughout substantially the whole length thereof, means for forcing water under pressure through said distributing tube into the upper ends of said generator tubes in quantity greater than will be evaporated in the respective generator tubes, but less than sufficient to fill said tubes, means for so directing said water against the inner walls of said tubes as to form a film on said walls and leave the centers of the tubes unobstructed and means for separating the water from the steam and water collected in the collecting tube.

11. Apparatus for generating steam, comprising a series of substantially direct generator tubes sufficiently inclined to the horizontal to insure rapid gravity flow and a distributing tube connected to the upper ends of said tubes, a collecting tube connected to the lower ends thereof, means for directing heated gases into heat-exchanging contact with said generator tubes throughout substantially the whole length thereof, means for forcing water under pressure through said distributing tube into the upper ends of said generator tubes in quantity greater than will be evaporated in the respective generator tubes, but less than sufficient to fill said tubes, means for so directing said water against the inner walls of said tubes as to form a film on said walls and leave the center of the tubes unobstructed, means for separating the water from the steam and water collected in the collecting tube, and means for returning said separated water to the distributing tube.

12. Apparatus for generating steam comprising a series of substantially direct thin tubes each of relatively great length compared with its diameter sufficiently inclined to the horizontal to insure rapid gravity flow and a distributing tube connected with the upper ends of said tubes, a collecting tube connected to the lower ends thereof, means for directing heated gases into heat-exchanging contact with said tubes from the lower to the upper ends thereof, means for forcing water under pressure through said distributing tube into the upper ends of the generator tubes in quantity greater than will be evaporated in the respective tubes but less than sufficient to fill them, means for so directing said water against the inner walls of said tubes as to form a film on said walls and leave the centers of the tubes unobstructed and means for separating the water from the steam and water collected in the collecting tube.

13. In a steam generator, a distributing tube, a series of generator tubes communicating therewith and having their ends fastened therein; and a second removable tube within said distributing tube and provided with discharge orifices registering with the ends of said generator tubes which communicate with said distributing tube.

14. In a steam generator, a complete circuit for the water therein comprising a generating element having an inlet for water at one end and an outlet for steam and water at the other end and through which the water and the steam generated therein move continuously in the same direction and from the same end of which both are discharged and a connection between the ends of said element through which the unvaporized water is returned to the receiving end thereof, means in said connection operating continuously to effect the return movement of the water therethrough, and means also in said return connection for separating the steam from the mixture of steam and water discharged from the generating element, said circuit further comprising means restricting the water delivered to said generating element to a quantity less than sufficient to fill said element but greater than the generating capacity thereof.

15. A steam generator according to claim 14 comprising means for directing heating gases over the generating element in counterflow to the direction of movement of the steam and water through said element.

16. In a steam generator, a positively defined circuit for the water therein including generating tubes each having an inlet for water at one end and an outlet for steam and water at the other end and through which the water and the steam generated therein move continuously in the same direction and from the same end of which both are discharged and a connection between the receiving and the discharge ends of said generating tubes through which the unvaporized water is returned to the receiving ends thereof, means in said connection operating continuously to effect the return movement of the water therethrough, means also in said return connection for separating the steam from the mixture of steam and water discharged from said generating tubes, said circuit further comprising means for positively distributing and restricting the water delivered to the respective generating tubes to a quantity less than sufficient to fill each tube but greater than the generating capacity thereof.

17. In a steam generator, a positively defined circuit for the water therein, including a generating tube, having an inlet for water at one end and an outlet for water and steam at the other end and of an inside diameter of less than one inch and of relatively great length in proportion to its diameter, through which the water and the steam generated therein move continuously in the same direction and from the same end of which both are discharged and a connection between the receiving and the discharge ends of said tube through which the unvaporized water is returned to the receiving end thereof, means in said connection operating continuously to effect the return movement of the water therethrough, means also in said return connection for separating the steam from the mixture of steam and water discharged from said tube, said circuit comprising means for restricting the water delivered to the receiving end of said tube to a quantity less than sufficient to fill said tube but greater than the generating capacity thereof.

18. In a steam generator, a positively defined circuit for the water therein, including generating tubes, each having an inlet for water at one end and an outlet for water and steam at the other end and each being of relatively small diameter and of relatively great length in proportion to the diameter, through which the water and the steam generated therein move continuously in the same direction and from the same ends of which both are discharged and a connection between the receiving and the discharge ends of said generating tubes including a distributing header and a collecting header common to the tubes and a common return through which the unvaporized water is returned to the distributing header, means in said connection operating continuously to effect the return movement of the water therethrough, means also in said connection for separating the steam from the mixture of steam and water discharged from said generating tubes, said circuit including means for positively distributing and restricting the water delivered to the respective generating tubes to a quantity less than sufficient to fill each tube but greater than the generating capacity thereof.

19. In a steam generator, a positively defined circuit for the water therein including a generating tube, of relatively small diameter and of relatively great length in proportion to its diameter, said tube having an inlet for water at one end and an outlet for water and steam at the other end and having an unobstructed interior through which the water and the steam generated therein move continuously in the same direction and from the same end of which both are discharged and a connection between the receiving and the discharge ends of said tube through which the unvaporized water is returned to the receiving end thereof, means in said connection operating continuously to effect the movement of the water therethrough, means also in said connection for separating the steam from the mixture of steam and water discharged from said tube, said circuit comprising means for restricting the water delivered to the tube to a quantity less than sufficient to fill said tube but greater than the generating capacity thereof.

20. The method of generating steam in a generating tube of relatively small diameter and of relatively great length in proportion to its diameter and having an unobstructed interior, which consists in causing the water and the steam which is generated from the water in said tube to move continuously in the same direction through the unobstructed interior of said tube, continuously introducing the water into one end of the generating tube in quantity less than sufficient to fill said tube but greater than the generating capacity thereof, continuously separating the steam from the mixture of steam and water after discharge from the other end of the tube, and continuously returning the separated water to the receiving end of said tube.

21. The method of generating steam in a generating tube which has one end closed to the discharge of steam and higher than the other end from which the steam and unevaporated water may freely discharge and which also has an unobstructed interior, which consists in causing the water and the steam generated from the water in said tube to move continuously in the same direction through the unobstructed interior of said tube, continuously introducing the water into said higher end of the generating tube in quantity less than sufficient to fill said tube but greater than the generating capacity thereof, separating the steam from the mixture of steam and water discharged from the lower end of the tube and continuously returning the separated water to the receiving end of said tube.

22. The method of generating steam in a stationary heated steam generating tube having one end closed to the discharge of steam while the other end is open for the free discharge of both steam and water, which consists in continuously introducing water into the closed end of the generating tube, so controlling the introduction of water that the tube is continuously supplied with more water than it can convert into steam but with less than sufficient to fill it, and effecting a continuous movement of the water and the steam in the same direction through the tube and a continuous discharge of the steam and the excess water from the discharge end thereof.

23. A steam generator comprising a generating tube closed at one end to the discharge of steam while the other end is left open for the free discharge of both steam and water, said tube having in its closed end an orifice through which water may be introduced into the tube but so restricted as to limit the amount introduced, means for continuously introducing water into said tube through said orifice, comprising a continuously operating pump, the pump being of such capacity and being adapted to be so operated as to produce a waterhead upon the orifice that, with respect to the restriction of the orifice and with respect to the heat applied to the tube, will deliver continuously to the tube a supply of water in excess of that which can be converted into steam in its passage through the tube but less than sufficient to fill the tube, whereby, during operation, a continuous movement of water and steam in the same direction through the tube and a continuous discharge of steam and excess water from the tube will occur.

Signed at New York, N. Y., this 8th day of July, 1927.

WALTER DOUGLAS LA MONT.